US010662290B2

(12) United States Patent
Kim et al.

(10) Patent No.: US 10,662,290 B2
(45) Date of Patent: May 26, 2020

(54) POLYAMIDE-IMIDE PRECURSOR, POLYAMIDE-IMIDE FILM AND DISPLAY DEVICE COMPRISING SAME

(71) Applicant: KOLON INDUSTRIES, INC., Gwacheon-si, Gyeonggi-do (KR)

(72) Inventors: Jae Il Kim, Yongin-si (KR); Hak Gee Jung, Yongin-si (KR)

(73) Assignee: KOLON INDUSTRIES, INC., Seoul (KR)

(*) Notice: Subject to any disclaimer, the term of this patent is extended or adjusted under 35 U.S.C. 154(b) by 182 days.

(21) Appl. No.: 15/540,789

(22) PCT Filed: Dec. 30, 2015

(86) PCT No.: PCT/KR2015/014499
§ 371 (c)(1),
(2) Date: Jun. 29, 2017

(87) PCT Pub. No.: WO2016/108631
PCT Pub. Date: Jul. 7, 2016

(65) Prior Publication Data
US 2018/0002486 A1 Jan. 4, 2018

(30) Foreign Application Priority Data
Dec. 30, 2014 (KR) .................. 10-2014-0194451
Dec. 29, 2015 (KR) .................. 10-2015-0188918

(51) Int. Cl.
*C08G 73/14* (2006.01)
*C08J 5/18* (2006.01)
*C08G 81/00* (2006.01)
*C08G 73/10* (2006.01)

(52) U.S. Cl.
CPC ............. *C08G 73/14* (2013.01); *C08G 81/00* (2013.01); *C08J 5/18* (2013.01); *C08G 73/1028* (2013.01);
(Continued)

(58) Field of Classification Search
CPC .... C08G 73/14; C08G 81/00; C08G 73/1028; C08G 73/1039; C08G 73/1042; C08G 73/1067; C08J 5/18; C08J 2379/08
(Continued)

(56) References Cited

U.S. PATENT DOCUMENTS

2008/0044684 A1* 2/2008 Chan ................... B29B 17/0042
428/626
2011/0059305 A1* 3/2011 Kaneya .............. C08G 73/1039
428/220

(Continued)

FOREIGN PATENT DOCUMENTS

| CN | 101959935 A | 1/2011 |
| CN | 103571190 A | 2/2014 |

(Continued)

OTHER PUBLICATIONS

European Patent Office; Communication dated Apr. 19, 2018 in counterpart European application No. 15875725.2.
(Continued)

*Primary Examiner* — Travis M Figg
(74) *Attorney, Agent, or Firm* — Sughrue Mion, PLLC

(57) ABSTRACT

This invention relates to a polyamide-imide precursor, a polyamide-imide obtained by imidizing the same, a polyamide-imide film, and an image display device including the film. The polyamide-imide precursor includes, in a molecular structure thereof, a first block, obtained by copolymerizing monomers including dianhydride and diamine, and a second block, obtained by copolymerizing monomers including an aromatic dicarbonyl compound and aromatic diamine. The dianhydride includes biphenyltetracarboxylic acid dianhydride (BPDA) and 2-bis(3,4-dicarboxyphenyl) hexafluoropropane dianhydride (6FDA), and the diamine includes bistrifluoromethylbenzidine (TFDB).

5 Claims, 1 Drawing Sheet

* △DC = |A−B|

(52) U.S. Cl.
CPC ..... *C08G 73/1039* (2013.01); *C08G 73/1042* (2013.01); *C08G 73/1067* (2013.01); *C08J 2379/08* (2013.01)

(58) Field of Classification Search
USPC .......................................................... 428/220
See application file for complete search history.

(56) References Cited

U.S. PATENT DOCUMENTS

| | | | | |
|---|---|---|---|---|
| 2012/0296050 | A1* | 11/2012 | Cho | C08G 73/14 525/436 |
| 2013/0202869 | A1* | 8/2013 | Cho | C08J 7/06 428/220 |
| 2013/0203937 | A1* | 8/2013 | Cho | C08G 73/1039 524/600 |
| 2014/0031499 | A1* | 1/2014 | Cho | C08G 73/1067 525/431 |
| 2014/0072813 | A1* | 3/2014 | Fujii | C08G 73/14 428/435 |
| 2014/0243482 | A1* | 8/2014 | Park | C08G 73/14 525/450 |
| 2014/0338959 | A1* | 11/2014 | Jung | C08J 5/18 174/253 |
| 2015/0057426 | A1* | 2/2015 | Cho | C08G 73/14 528/340 |

FOREIGN PATENT DOCUMENTS

| | | |
|---|---|---|
| CN | 104011109 A | 8/2014 |
| CN | 104115238 A | 10/2014 |
| CN | 104151823 A | 11/2014 |
| EP | 2540760 A1 | 1/2013 |
| KR | 10-2013-0029129 A | 3/2013 |
| KR | 20130029129 A † | 3/2013 |
| KR | 10-2013-0035691 A | 4/2013 |
| KR | 20130035691 A † | 4/2013 |
| KR | 20130074167 A † | 7/2013 |
| KR | 10-2014-0012270 A | 2/2014 |
| KR | 10-2014-0085064 A | 7/2014 |
| WO | 2014/003210 A1 | 1/2014 |
| WO | 2014003451 A1 | 1/2014 |

OTHER PUBLICATIONS

Office Action for corresponding Taiwanese Patent Application No. 104144513, dated Oct. 31, 2016.
International Search Report for PCT/KR2015/014499, dated Mar. 29, 2016.

\* cited by examiner
† cited by third party

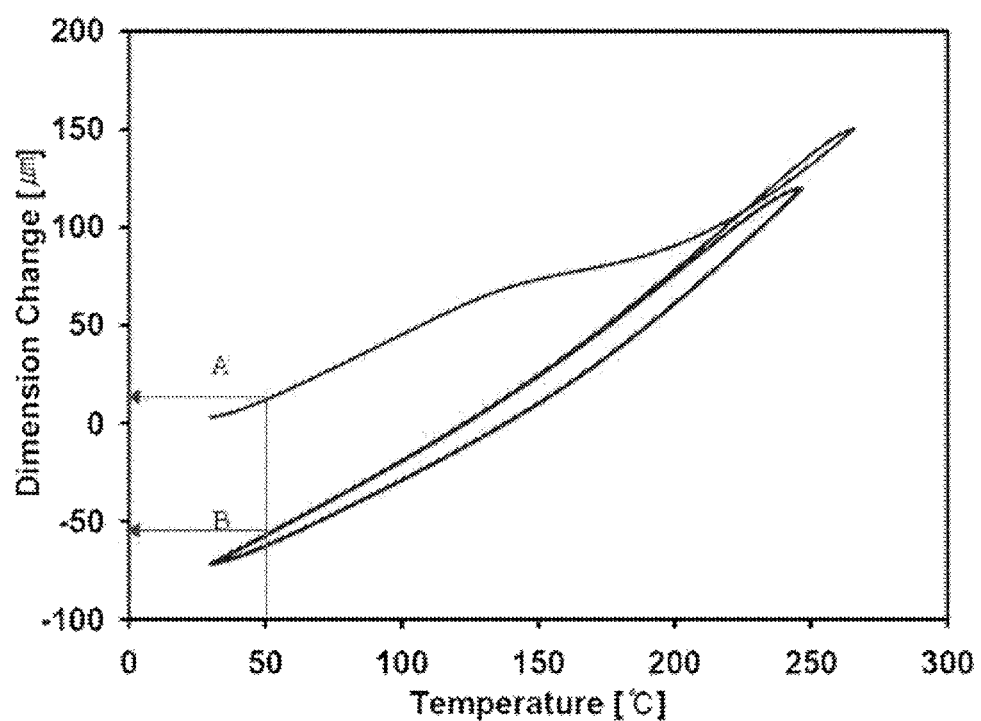
* △DC = |A−B|

POLYAMIDE-IMIDE PRECURSOR, POLYAMIDE-IMIDE FILM AND DISPLAY DEVICE COMPRISING SAME

CROSS REFERENCE TO RELATED APPLICATIONS

This Application is a National Stage of International Application No. PCT/KR2015/014499 filed Dec. 30, 2015, claiming priority based on Korean Patent Application No. 10-2014-0194451 filed Dec. 30, 2014 and Korean Patent Application No. 10-2015-0188918 filed Dec. 29, 2015, the contents of all of which are incorporated herein by reference in their entirety.

TECHNICAL FIELD

The present invention relates to a polyamide-imide precursor, a polyamide-imide film obtained by imidizing the polyamide-imide precursor, and a display device including the polyamide-imide film.

BACKGROUND ART

Generally, a polyimide (PI) film is obtained by shaping a polyimide resin into a film. The polyimide resin is a highly heat-resistant resin which is prepared by performing solution polymerization of aromatic dianhydride and aromatic diamine or aromatic diisocyanate to prepare a polyamic acid derivative and then performing imidization by ring-closing dehydration at a high temperature. Having excellent mechanical, heat resistance, and electrical insulation properties, the polyimide film is used in a wide range of electronic materials such as semiconductor insulating films, electrode-protective films of TFT-LCDs, and substrates for flexible printed wiring circuits.

Polyimide resins, however, are usually colored brown and yellow due to a high aromatic ring density, so that transmittance in a visible ray region is low and the resins exhibit a yellowish color. Accordingly, light transmittance is reduced and birefringence is high, which makes it difficult to use the polyimide resins as optical members.

In order to solve the above-described limitation, attempts have been made to perform polymerization using purification of monomers and solvents, but the improvement in transmittance was not significant. With respect thereto, in U.S. Pat. No. 5,053,480, the transparency and hue are improved when the resin is in a solution or in a film form using a method using an aliphatic cyclic dianhydride component instead of aromatic dianhydride. However, this was only an improvement of the purification method, and there remains a limitation in the ultimate increase in transmittance. Accordingly, high transmittance could not be achieved, but the thermal and mechanical deterioration resulted.

Further, U.S. Pat. Nos. 4,595,548, 4,603,061, 4,645,824, 4,895,972, 5,218,083, 5,093,453, 5,218,077, 5,367,046, 5,338,826, 5,986,036, and 6,232,428 and Korean Patent Application Publication No. 2003-0009437 disclose a novel structure of polyimide having improved transmittance and color transparency while thermal properties are not significantly reduced using aromatic dianhydride and aromatic diamine monomers having a substituent group such as —$CF_3$ or having a bent structure in which connection to a m-position instead of a p-position occurs due to a connection group such as —O—, —$SO_2$—, or —$CH_2$—. However, this has been found to be insufficient for use as materials for display devices such as OLEDs, TFT-LCDs, and flexible displays due to limitations in terms of mechanical properties, heat resistance, and birefringence.

DISCLOSURE

Technical Problem

Accordingly, the present invention is intended to provide a polyamide-imide precursor for forming a colorless and transparent film having low birefringence and excellent mechanical properties and heat resistance. In addition, the present invention is intended to provide a polyamide-imide film, manufactured by imidizing the polyamide-imide precursor, and an image display device including the polyamide-imide film.

Technical Solution

Therefore, a preferable first embodiment of the present invention provides a polyamide-imide precursor which includes, in a molecular structure thereof, a first block, obtained by copolymerizing monomers including dianhydride and diamine, and a second block, obtained by copolymerizing monomers including an aromatic dicarbonyl compound and aromatic diamine. The dianhydride includes biphenyltetracarboxylic acid dianhydride (BPDA) and 2-bis (3,4-dicarboxyphenyl)hexafluoropropane dianhydride (6FDA), and the diamine includes bistrifluoromethylbenzidine (TFDB).

Further, a preferable second embodiment of the present invention provides polyamide-imide having a structure which is obtained by imidizing the polyamide-imide precursor of the first embodiment, and a third embodiment provides a polyamide-imide film which is manufactured by imidizing the polyamide-imide precursor of the first embodiment.

Moreover, a preferable fourth embodiment of the present invention provides an image display device including the polyamide-imide film of the third embodiment.

Advantageous Effects

When the polyamide-imide precursor of the present invention is imidized, it is possible to form a colorless and transparent film having low birefringence and excellent mechanical properties and heat resistance. Particularly, the polyamide-imide film manufactured according to the embodiments of the present invention may be useful for various fields such as a semiconductor insulating film, a TFT-LCD insulating film, a passivation film, a liquid crystal alignment film, an optical communication material, a protective film for a solar cell, and a flexible display substrate.

BRIEF DESCRIPTION OF DRAWINGS

FIG. 1 is a graph showing a dimension change of an example of a polyimide film of the present invention (based on a film thickness of 12 μm) when repeatedly measured one to three times in a section at 50 to 250° C. using a thermomechanical analysis method (TMA-method).

BEST MODE

The embodiment of the present invention provides a polyamide-imide precursor which includes, in the molecular structure thereof, a first block, obtained by copolymerizing monomers including dianhydride and diamine, and a second block, obtained by copolymerizing monomers including an aromatic dicarbonyl compound and aromatic diamine. The dianhydride includes biphenyltetracarboxylic acid dianhydride (BPDA) and 2-bis(3,4-dicarboxyphenyl)hexafluoropropane dianhydride (6FDA), and the diamine includes bistrifluoromethylbenzidine (TFDB).

To be more specific, the embodiment of the present invention provides a polyamide-imide precursor which includes, in a molecular structure thereof, a first block, obtained by copolymerizing dianhydride including biphenyltetracarboxylic acid dianhydride (BPDA) and 2-bis(3,4-dicarboxyphenyl)hexafluoropropane dianhydride (6FDA) with diamine including bistrifluoromethylbenzidine (TFDB), and a second block obtained by copolymerizing an aromatic dicarbonyl compound with aromatic diamine.

When the polyamide-imide precursor of the embodiment of in the present invention is formed into a film for use as a substrate or a protective layer of an image display device, the polyamide-imide precursor is obtained by polymerization which is performed so that both the first block including an imide bond and the second block including an amide bond are present in the molecular structure thereof, thus ensuring excellent thermal and mechanical properties as well as excellent optical properties. That is, the mechanical properties, which may be poor when the precursor is composed only of the imide structure, may be improved using the second block including the amide bond, thereby ultimately improving thermal stability, mechanical properties, low birefringence, and optical characteristics in a balanced manner.

Particularly, in the embodiment of the present invention, bistrifluoromethyl benzidine (TFDB) may be used as the diamine for forming the first block, thus improving thermal stability and optical characteristics, and 2-bis(3,4-dicarboxyphenyl)hexafluoropropane dianhydride (6FDA) and biphenyltetracarboxylic acid dianhydride (BPDA) may be used as the dianhydride, thus improving birefringence and ensuring heat resistance.

The dianhydride for forming the first block include both kinds of dianhydrides, that is, both 6FDA and BPDA. Accordingly, in the first block, a polymer, in which TFDB and 6FDA are combined, and a polymer, in which TFDB and BPDA are combined, may be separately included on the basis of separate repeating units, may be regularly arranged in the same repeating unit, or may be included so as to be completely randomly arranged.

In the present invention, among the monomers for forming the first block, BPDA and 6FDA as the dianhydride may be preferably included at a molar ratio of 1:3 to 3:1 so as to ensure the optical properties, to prevent the mechanical properties and the heat resistance from being reduced, and to exhibit excellent birefringence. When the ratio of BPDA is less than ⅓ of that of 6FDA, that is, when 6FDA is added in an amount which is more than 3 times that of BPDA, the heat resistance and the mechanical properties may not be ensured. On the other hand, when the ratio of BPDA is more than 3 times that of 6FDA, that is, when the ratio of 6FDA is less than ⅓ that of BPDA, the mechanical properties may be improved while the birefringence value increases, which is not desirable.

Further, in the embodiment of the present invention, it is preferable that the molar ratio of the first block and the second block be 5:1 to 1:1. When the content of the second block is remarkably low, since the improvement in thermal stability and mechanical properties is insignificant, twisting and tearing phenomena may occur during a process for manufacturing displays. On the other hand, when the content of the second block is higher than the content of the first block, the thermal stability and the mechanical properties may be improved, but optical properties such as a yellow index or a transmittance may be reduced and birefringence may be increased, which makes the precursor difficult to apply to optical devices. However, the first block and the second block may constitute a random copolymer or a block copolymer, and the repeating unit of the block is not particularly limited in the present invention.

In the embodiment of the present invention, the aromatic dicarbonyl compound for forming the second block may be one or more selected from the group consisting of terephthaloyl chloride (p-terephthaloyl chloride, TPC), terephthalic acid, iso-phthaloyl dichloride, and 4,4'-benzoyl dichloride (4,4'-benzoyl chloride) and, more preferably, may be one or more selected from among terephthaloyl chloride (p-terephthaloyl chloride, TPC) and iso-phthaloyl dichloride.

Further, the diamine for forming the second block may be diamine having one or more flexible groups selected from the group consisting of 2,2-bis(4-(4-aminophenoxy)phenyl) hexafluoropropane (HFBAPP), bis(4-(4-aminophenoxy) phenyl)sulfone (BAPS), bis(4-(3-minophenoxy)phenyl)sulfone (BAPSM), 4,4'-diaminodiphenylsulfone (4DDS), 3,3'-diaminodiphenylsulfone (3DDS), 2,2-bis(4-(4-aminophenoxy)phenylpropane (BAPP), 4,4'-diaminodiphenylpropane (6HDA), 1,3-bis(4-aminophenoxy)benzene (134APB), 1,3-bis(3-aminophenoxy)benzene (133APB), 1,4-bis(4-aminophenoxy)biphenyl (BAPB), 4,4'-bis(4-amino-2-trifluoromethylphenoxy)biphenyl (6FAPBP), 3,3-diamino-4,4-dihydroxydiphenylsulfone (DABS), 2,2-bis(3-amino-4-hydroxyphenyl)propane (BAP), 4,4'-diaminodiphenylmethane (DDM), 4,4'-oxydianiline (4-ODA), and 3,3'-oxydianiline (3-ODA).

When the aromatic dicarbonyl compound is used, it may be easy to realize high thermal stability and mechanical properties, but birefringence may be high due to a benzene ring in the molecular structure. Accordingly, in order to prevent a reduction in birefringence caused by the second block in the present invention, preferably, the diamine has a molecular structure including a flexible group. More preferably, the diamine is one or more selected from among bis(4-(3-aminophenoxy)phenyl)sulfone (BAPSM), 4,4'-diaminodiphenylsulfone (4DDS), and 2,2-bis(4-(4-aminophenoxy)phenyl)hexafluoropropane (HFBAPP). Particularly, the diamine, such as BAPSM, having a long flexible group and a substituent group, which is present at a meta position, may exhibit the excellent birefringence.

In the embodiment of the present invention, the polyamide-imide precursor includes, in the molecular structure thereof, the first block, obtained by copolymerizing the dianhydride including biphenyltetracarboxylic acid dianhydride (BPDA) and 2-bis(3,4-dicarboxyphenyl)hexafluoropropane dianhydride (6FDA) with the diamine including bistrifluoromethylbenzidine (TFDB), and the second block, obtained by copolymerizing the aromatic dicarbonyl compound with the aromatic diamine using polymerization of the monomers. The polyamide-imide precursor preferably has a a weight average molecular weight of 200,000 to 215,000, measured using GPC (gel permeation chromatography), and a viscosity of 2400 to 2600 poise.

Meanwhile, the embodiment of the present invention may provide polyamide-imide having a structure obtained by ring-closing dehydration, that is, imidization, of the polyamide-imide precursor, or may provide a polyamide-imide film manufactured by imidizing the polyamide-imide precursor. In the embodiment of the present invention, in order to manufacture the polyamide-imide resin or the polyamide-imide film using the polyamide-imide precursor, the following imidization step may be carried out.

First, a polyamide-imide precursor solution is manufactured by copolymerizing <aromatic dianhydride> and <aromatic dicarbonyl compound and diamine> satisfying the above-described conditions of the present invention at an equivalent ratio of 1:1. The polymerization reaction condition is not particularly limited, but the polymerization reaction may be preferably performed in an inert atmosphere such as nitrogen or argon at −10 to 80° C. for 2 to 48 hours.

A solvent may be used for the solution polymerization reaction of the monomers. The solvent is not particularly limited as long as it is a known reaction solvent, but one or more polar solvents selected from among m-cresol, N-methyl-2-pyrrolidone (NMP), dimethylformamide (DMF), dimethylacetamide (DMAc), dimethyl sulfoxide (DMSO), acetone, and ethyl acetate may be preferably used. In addition, a low-boiling-point solution, such as tetrahydrofuran (THF) and chloroform, or a low-absorbency solvent, such as γ-butyrolactone, may be used.

Further, the content of the solvent is not particularly limited. However, in order to obtain the appropriate molecular weight and viscosity of the polyamide-imide precursor solution, the content of the solvent may be preferably 50 to 95 wt %, and more preferably 70 to 90 wt %, based on the total content of the polyamide-imide precursor solution.

Subsequently, a known imidization method may be appropriately selected to imidize the obtained polyamide-imide precursor solution. For example, a thermal imidization method or a chemical imidization method may be applied, or a thermal imidization method and a chemical imidization method may be applied in combination.

In the chemical imidization method, a dehydrating agent, which is represented by acid anhydride such as acetic anhydride, and an imidization catalyst, which is represented by tertiary amines such as isoquinoline, β-picoline, and pyridine, are added to the polyimide-imide precursor solution to perform a reaction. In the thermal imidization method, the polyamide-imide precursor solution is slowly heated at a temperature range of 40 to 300° C. for 1 to 8 hours to perform a reaction.

In the embodiment of the present invention, a complex imidization method in which the thermal imidization method and the chemical imidization method are used in combination may be applied as an example of a method of manufacturing the polyamide-imide film. To be more specific, the complex imidization method may be performed through a series of processes. In the processes, the dehydrating agent and the imidization catalyst are added to the polyamide-imide precursor solution to be cast on a support, and are then heated to 80 to 200° C., and preferably 100 to 180° C., to be activated. The resulting substance is partially cured and dried, followed by heating at 200 to 400° C. for 5 to 400 seconds.

Further, in the embodiment of the present invention, the obtained polyamide-imide precursor solution may be imidized, and the imidized solution may be added to a second solvent, followed by precipitation, filtration, and drying to thus obtain a polyamide-imide resin solid. The obtained polyamide-imide resin solid may be dissolved in a first solvent for film formation, thereby manufacturing a polyamide-imide film. As for the drying conditions after the polyamide-imide resin solid is filtered, preferably, the temperature is 50 to 120° C. and the time is 3 to 24 hours in consideration of the boiling point of the second solvent.

Casting may be performed and the temperature may be slowly increased at a temperature range of 40 to 400° C. for 1 minutes to 8 hours, thereby achieving the film formation process.

Further, the first solvent may be the same as the solvent used during the polymerization of the polyamide-imide precursor solution. As the second solvent, a solvent having a polarity lower than that of the first solvent, that is, one or more selected from among water, alcohols, ethers, and ketones, may be used in order to obtain the polyamide-imide resin solid. The content of the second solvent is not particularly limited, but is preferably 5 to 20 times by weight based on the weight of the polyamide-imide precursor solution.

In the present invention, the obtained polyamide-imide film may be additionally heat-treated once more in order to eliminate the thermal history and the residual stress remaining in the film. The temperature of the additional heat treatment process is preferably 300 to 500° C. and the heat treatment time is preferably 1 minutes to 3 hours. The residual volatile content of the heat-treated film may be 5% or less, and preferably 3% or less. As a result, the heat-treated film ultimately exhibits very stable thermal properties.

In the present invention, the thickness of the polyamide-imide film is not particularly limited, but is preferably in the range of 5 to 100 μm, and more preferably 9 to 15 μm.

The polyamide-imide film according to the present invention exhibits optical properties including a birefringence (n) of 0.017 or less, preferably 0.0127 or less, and more preferably 0.009 or less which is defined using TE (transverse electric)-TM (transverse magnetic) based on a film thickness of 10 to 50 μm, a transmittance of 88% or more, and preferably 89% or more which is measured at 550 nm, and a yellow index of 6.5 or less, preferably 5.4 or less, and more preferably 4.1 or less thus being useful for an optical device such as a substrate or a protective layer of a display.

Further, the polyamide-imide film according to the present invention may have a coefficient of linear thermal expansion (CTE) of 70 ppm/° C. or less, preferably 60 ppm/° C. or less, and more preferably 54 ppm/° C. or less which is repeatedly measured twice at 50 to 250° C. using a thermomechanical analysis method (TMA method) based on a film thickness of 10 to 50 μm, and may have a dimension change difference (ΔDC) of 100 μm or less, preferably 76 μm or less, more preferably 58 μm or less, and more preferably 42 μm or less which is defined by a difference (|A−B|) between a minimum value on a first heat-increasing curve (a dimension change value measured at 50° C., A) and a minimum value on a cooling curve (a dimension change value measured at 50° C., B) when repeatedly measured one to three times in a section at 50 to 250° C. using a thermomechanical analysis method (TMA-method) based on 10 to 50 μm.

Further, since an elongation at break measured based on ASTM D882 (a film thickness of 10 to 50 μm) is 7% or more, and preferably 8% or more bending or deformation does not easily occur even under severe process conditions or sudden temperature change during the manufacture of displays. Accordingly, excellent yield may be exhibited.

Further, since the above-mentioned polyimide film is included in the present invention, it is possible to provide an image display device having excellent optical and physical properties and high manufacturing yield.

MODE FOR INVENTION

Example

A better understanding of the present invention may be obtained through the following Examples which are set forth to illustrate, but are not to be construed to limit the present invention.

Example 1

In a 500 ml reactor which was equipped with a stirrer, a nitrogen injector, a dropping funnel, a temperature controller, and a condenser, 280.215 g of N-methyl-2-pyrrolidone (NMP) was charged while passing nitrogen therethrough, and 30.742 g (0.096 mol) of bistrifluoromethylbenzidine (TFDB) was dissolved. 21.184 g (0.072 mol) of biphenyltetracarboxylic acid dianhydride (BPDA) was reacted therewith for 1 hour. Subsequently, 9.063 g (0.0204 mol) of 2-bis(3,4-dicarboxyphenyl)hexafluoropropane dianhydride (6FDA) was added and reacted for 2 hours, and then 12.443 g (0.024 mol) of 2,2-bis(4-(4-aminophenoxy)phenyl)hexafluoropropane (HFBAPP) was added and dissolved for 1 hour. After the temperature of the solution was maintained at 15° C. or less, 6.434 g (0.1104 mol) of propylene oxide was added, and then 5.603 g (0.0276 mol) of terephthaloyl chloride (TPC) was added and reacted for 18 hours, thus obtaining a polyamide-imide precursor solution having a solid concentration of 22 wt % and a viscosity of 2510 poise.

After the completion of the reaction, the obtained solution was applied on a stainless steel plate, cast to 60 µm, dried in hot air at 80° C. for 30 minutes, at 150° C. for 30 minutes, and at 280° C. for 30 minutes, slowly cooled, and separated from the plate, thus manufacturing a polyamide-imide film having a thickness of 12 µm.

Example 2

In a 500 ml reactor which was equipped with a stirrer, a nitrogen injector, a dropping funnel, a temperature controller, and a condenser, 291.254 g of N-methyl-2-pyrrolidone (NMP) was charged while passing nitrogen therethrough, and 30.742 g (0.096 mol) of TFDB was dissolved. 14.123 g (0.048 mol) of BPDA was reacted therewith for 1 hour. Subsequently, 19.725 g (0.0444 mol) of 6FDA was added and reacted for 2 hours, and then 12.443 g (0.024 mol) of HFBAPP was added and dissolved for 1 hour. After the temperature of the solution was maintained at 15° C. or less, 6.434 g (0.1104 mol) of propylene oxide was added, and then 5.603 g (0.0276 mol) of TPC was added and reacted for 18 hours, thus obtaining a polyamide-imide precursor solution having a solid concentration of 22 wt % and a viscosity of 2010 poise.

Subsequently, a polyamide-imide film was manufactured according to the same procedure as in Example 1.

Example 3

In a 500 ml reactor which was equipped with a stirrer, a nitrogen injector, a dropping funnel, a temperature controller, and a condenser, 291.254 g of N-methyl-2-pyrrolidone (NMP) was charged while passing nitrogen therethrough, and 30.742 g (0.096 mol) of TFDB was dissolved. 7.061 g (0.024 mol) of BPDA was reacted therewith for 1 hour. Subsequently, 30.387 g (0.0684 mol) of 6FDA was added and reacted for 2 hours, and then 12.443 g (0.024 mol) of HFBAPP was added and dissolved for 1 hour. After the temperature of the solution was maintained at 15° C. or less, 6.434 g (0.1104 mol) of propylene oxide was added, and then 5.603 g (0.0276 mol) of TPC was added and reacted for 18 hours, thus obtaining a polyamide-imide precursor solution having a solid concentration of 22 wt % and a viscosity of 1860 poise.

Subsequently, a polyamide-imide film was manufactured according to the same procedure as in Example 1.

Example 4

In a 500 ml reactor which was equipped with a stirrer, a nitrogen injector, a dropping funnel, a temperature controller, and a condenser, 292.981 g of N-methyl-2-pyrrolidone (NMP) was charged while passing nitrogen therethrough, and 30.742 g (0.096 mol) of TFDB was dissolved. 14.123 g (0.048 mol) of BPDA was reacted therewith for 1 hour. Subsequently, 19.725 g (0.0444 mol) of 6FDA was added and reacted for 2 hours, and then 12.443 g (0.024 mol) of HFBAPP was added and dissolved for 1 hour. After the temperature of the solution was maintained at 15° C. or less, 6.434 g (0.1104 mol) of propylene oxide was added, and then 5.603 g (0.0276 mol) of iso-phthaloyl dichloride (IPC) was added and reacted for 18 hours, thus obtaining a polyamide-imide precursor solution having a solid concentration of 22 wt % and a viscosity of 1460 poise.

Subsequently, a polyamide-imide film was manufactured according to the same procedure as in Example 1.

Example 5

In a 500 ml reactor which was equipped with a stirrer, a nitrogen injector, a dropping funnel, a temperature controller, and a condenser, 294.343 g of N-methyl-2-pyrrolidone (NMP) was charged while passing nitrogen therethrough, and 26.899 g (0.084 mol) of TFDB was dissolved. 12.357 g (0.042 mol) of BPDA was reacted therewith for 1 hour. Subsequently, 17.059 g (0.0384 mol) of 6FDA was added and reacted for 2 hours, and then 18.665 g (0.036 mol) of HFBAPP was added and dissolved for 1 hour. After the temperature of the solution was maintained at 15° C. or less, 9.232 g (0.1584 mol) of propylene oxide was added, and then 8.040 g (0.0396 mol) of TPC was added and reacted for 18 hours, thus obtaining a polyamide-imide precursor solution having a solid concentration of 22 wt % and a viscosity of 1560 poise.

Subsequently, a polyamide-imide film was manufactured according to the same procedure as in Example 1.

Example 6

In a 500 ml reactor which was equipped with a stirrer, a nitrogen injector, a dropping funnel, a temperature controller, and a condenser, 298.958 g of N-methyl-2-pyrrolidone (NMP) was charged while passing nitrogen therethrough, and 19.214 g (0.06 mol) of TFDB was dissolved. 8.827 g (0.03 mol) of BPDA was reacted therewith for 1 hour. Subsequently, 12.261 g (0.0276 mol) of 6FDA was added and reacted for 2 hours, and then 31.108 g (0.06 mol) of HFBAPP was added and dissolved for 1 hour. After the temperature of the solution was maintained at 15° C. or less, 14.826 g (0.254 mol) of propylene oxide was added, and then 12.912 g (0.0636 mol) of TPC was added and reacted for 18 hours, thus obtaining a polyamide-imide precursor solution having a solid concentration of 22 wt % and a viscosity of 1364 poise.

Subsequently, a polyamide-imide film was manufactured according to the same procedure as in Example 1.

Example 7

In a 500 ml reactor which was equipped with a stirrer, a nitrogen injector, a dropping funnel, a temperature controller, and a condenser, 285.666 g of N-methyl-2-pyrrolidone (NMP) was charged while passing nitrogen therethrough, and 30.742 g (0.096 mol) of TFDB was dissolved. 14.123 g (0.048 mol) of BPDA was reacted therewith for 1 hour. Subsequently, 19.725 g (0.0444 mol) of 6FDA was added and reacted for 2 hours, and then 10.38 g (0.024 mol) of bis(4-(3-aminophenoxy)phenyl)sulfone (BAPSM) was added and dissolved for 1 hour. After the temperature of the solution was maintained at 15° C. or less, 6.434 g (0.1104 mol) of propylene oxide was added, and then 5.603 g (0.0276 mol) of TPC was added and reacted for 18 hours, thus obtaining a polyamide-imide precursor solution having a solid concentration of 22 wt % and a viscosity of 3010 poise.

Subsequently, a polyamide-imide film was manufactured according to the same procedure as in Example 1.

Example 8

In a 500 ml reactor which was equipped with a stirrer, a nitrogen injector, a dropping funnel, a temperature controller, and a condenser, 291.254 g of N-methyl-2-pyrrolidone (NMP) was charged while passing nitrogen therethrough, and 30.742 g (0.096 mol) of TFDB was dissolved. 14.123 g (0.048 mol) of BPDA was reacted therewith for 1 hour. Subsequently, 19.725 g (0.0444 mol) of 6FDA was added and reacted for 2 hours, and then 5.959 g (0.024 mol) of 4,4'-diaminodiphenylsulfone (4DDS) was added and dissolved for 1 hour. After the temperature of the solution was maintained at 15° C. or less, 6.434 g (0.1104 mol) of propylene oxide was added, and then 5.603 g (0.0276 mol) of TPC was added and reacted for 18 hours, thus obtaining a polyamide-imide precursor solution having a solid concentration of 22 wt % and a viscosity of 518 poise.

Subsequently, a polyamide-imide film was manufactured according to the same procedure as in Example 1.

Comparative Example 1

In a 500 ml reactor which was equipped with a stirrer, a nitrogen injector, a dropping funnel, a temperature controller, and a condenser, 327.071 g of N-methyl-2-pyrrolidone (NMP) was charged while passing nitrogen therethrough, and 41.477 g (0.08 mol) of HFBAPP was added and dissolved. After the temperature of the solution was maintained at 15° C. or less, 18.65 g (0.32 mol) of propylene oxide was added, and then 16.242 g (0.08 mol) of TPC was added and reacted for 18 hours, thus obtaining a polyamide-imide precursor solution having a solid concentration of 15 wt % and a viscosity of 1640 poise.

Subsequently, a polyamide-imide film was manufactured according to the same procedure as in Example 1.

Comparative Example 2

In a 500 ml reactor which was equipped with a stirrer, a nitrogen injector, a dropping funnel, a temperature controller, and a condenser, 327.071 g of N-methyl-2-pyrrolidone (NMP) was charged while passing nitrogen therethrough, and 41.477 g (0.08 mol) of HFBAPP was added and dissolved. After the temperature of the solution was maintained at 15° C. or less, 18.65 g (0.32 mol) of propylene oxide was added, and then 16.242 g (0.08 mol) of IPC was added and reacted for 18 hours, thus obtaining a polyamide-imide precursor solution having a solid concentration of 15 wt % and a viscosity of 1140 poise.

Subsequently, a polyamide-imide film was manufactured according to the same procedure as in Example 1.

Comparative Example 3

In a 500 ml reactor which was equipped with a stirrer, a nitrogen injector, a dropping funnel, a temperature controller, and a condenser, 288.098 g of N-methyl-2-pyrrolidone (NMP) was charged while passing nitrogen therethrough, and 34.599 g (0.08 mol) of BAPSM was added and dissolved. After the temperature of the solution was maintained at 15° C. or less, 18.65 g (0.32 mol) of propylene oxide was added, and then 16.242 g (0.08 mol) of TPC was added and reacted for 18 hours, thus obtaining a polyamide-imide precursor solution having a solid concentration of 15 wt % and a viscosity of 210 poise.

Subsequently, a polyamide-imide film was manufactured according to the same procedure as in Example 1.

Comparative Example 4

In a 500 ml reactor which was equipped with a stirrer, a nitrogen injector, a dropping funnel, a temperature controller, and a condenser, 324.958 g of N-methyl-2-pyrrolidone (NMP) was charged while passing nitrogen therethrough, and 19.865 g (0.08 mol) of 4DDS was added and dissolved. After the temperature of the solution was maintained at 15° C. or less, 18.65 g (0.32 mol) of propylene oxide was added, and then 16.242 g (0.08 mol) of TPC was added and reacted for 18 hours, thus obtaining a polyamide-imide precursor solution having a solid concentration of 10 wt % and a viscosity of 24 poise.

Subsequently, a polyamide-imide film was manufactured according to the same procedure as in Example 1.

Comparative Example 5

In a 500 ml reactor which was equipped with a stirrer, a nitrogen injector, a dropping funnel, a temperature controller, and a condenser, 312.94 g of N-methyl-2-pyrrolidone (NMP) was charged while passing nitrogen therethrough, and 38.428 g (0.12 mol) of TFDB was added and dissolved. Subsequently, 26.48 g (0.09 mol) of BPDA was added and reacted for 2 hours, and then 13.328 g (0.03 mol) of 6FDA was added thereto and reacted for 18 hours, thus obtaining a polyamide-imide precursor solution having a solid concentration of 20 wt % and a viscosity of 450 poise.

Subsequently, a polyamide-imide film was manufactured according to the same procedure as in Example 1.

Comparative Example 6

In a 500 ml reactor which was equipped with a stirrer, a nitrogen injector, a dropping funnel, a temperature controller, and a condenser, 330.943 g of N-methyl-2-pyrrolidone (NMP) was charged while passing nitrogen therethrough, and 38.428 g (0.12 mol) of TFDB was added and dissolved. Subsequently, 17.653 g (0.06 mol) of BPDA was added and reacted for 2 hours, and then 26.655 g (0.03 mol) of 6FDA was added thereto and reacted for 18 hours, thus obtaining a polyamide-imide precursor solution having a solid concentration of 20 wt % and a viscosity of 342 poise.

Subsequently, a polyamide-imide film was manufactured according to the same procedure as in Example 1.

Comparative Example 7

In a 500 ml reactor which was equipped with a stirrer, a nitrogen injector, a dropping funnel, a temperature controller, and a condenser, 348.947 g of N-methyl-2-pyrrolidone (NMP) was charged while passing nitrogen therethrough, and 38.428 g (0.12 mol) of TFDB was added and dissolved. Subsequently, 8.827 g (0.03 mol) of BPDA was added and reacted for 2 hours, and then 39.983 g (0.09 mol) of 6FDA was added thereto and reacted for 18 hours, thus obtaining a polyamide-imide precursor solution having a solid concentration of 20 wt % and a viscosity of 245 poise.

Subsequently, a polyamide-imide film was manufactured according to the same procedure as in Example 1.

Comparative Example 8

In a 500 ml reactor which was equipped with a stirrer, a nitrogen injector, a dropping funnel, a temperature controller, and a condenser, 317.68 g of N-methyl-2-pyrrolidone (NMP) was charged while passing nitrogen therethrough, and 26.899 g (0.084 mol) of TFDB was dissolved. 36.197 g (0.08148 mol) of 6FDA was added thereto and reacted for 2 hours, and then 18.665 g (0.036 mol) of HFBAPP was added and dissolved for 1 hour. After the temperature of the solution was maintained at 15° C. or less, 8.392 g (0.144 mol) of propylene oxide was added, and then 7.309 g (0.036 mol) of TPC was added and reacted for 18 hours, thus obtaining a polyamide-imide precursor solution having a solid concentration of 22 wt % and a viscosity of 1840 poise. Subsequently, a polyamide-imide film was manufactured according to the same procedure as in Example 1.

Comparative Example 9

In a 500 ml reactor which was equipped with a stirrer, a nitrogen injector, a dropping funnel, a temperature controller, and a condenser, 274.343 g of N-methyl-2-pyrrolidone (NMP) was charged while passing nitrogen therethrough, and 26.899 g (0.084 mol) of TFDB was dissolved. 23.973 g (0.0814 mol) of BPDA was added and reacted for 2 hours, and then 18.665 g (0.036 mol) of HFBAPP was added and dissolved for 1 hour. After the temperature of the solution was maintained at 15° C. or less, 8.392 g (0.144 mol) of propylene oxide was added, and then 7.309 g (0.036 mol) of TPC was added and reacted for 18 hours, thus obtaining a polyamide-imide precursor solution having a solid concentration of 22 wt % and a viscosity of 1140 poise. Subsequently, a polyamide-imide film was manufactured according to the same procedure as in Example 1.

Comparative Example 10

In a 500 ml reactor which was equipped with a stirrer, a nitrogen injector, a dropping funnel, a temperature controller, and a condenser, 273.972 g of N-methyl-2-pyrrolidone (NMP) was charged while passing nitrogen therethrough, and 20.859 g (0.084 mol) of 4DDS was dissolved. 12.357 g (0.042 mol) of BPDA was added and reacted for 2 hours, and 17.539 g (0.0394 mol) of 6FDA was added and then reacted for 2 hours. Subsequently, 18.665 g (0.036 mol) of HFBAPP was added and dissolved for 1 hour. After the temperature of the solution was maintained at 15° C. or less, 8.392 g (0.144 mol) of propylene oxide was added, and then 7.309 g (0.036 mol) of TPC was added and reacted for 18 hours, thus obtaining a polyamide-imide precursor solution having a solid concentration of 22 wt % and a viscosity of 214 poise. Subsequently, a polyamide-imide film was manufactured according to the same procedure as in Example 1.

Comparative Example 11

In a 500 ml reactor which was equipped with a stirrer, a nitrogen injector, a dropping funnel, a temperature controller, and a condenser, 261.6 g of N-methyl-2-pyrrolidone (NMP) was charged while passing nitrogen therethrough, and 26.899 g (0.084 mol) of TFDB and 8.94 g (0.036 mol) of 4DDS were dissolved. 12.357 g (0.042 mol) of BPDA and 17.539 g (0.0394 mol) of 6FDA were added and dissolved. After the temperature of the solution was maintained at 15° C. or less, 8.392 g (0.144 mol) of propylene oxide was added, and then 7.309 g (0.036 mol) of TPC was added and reacted for 18 hours, thus obtaining a polyamide-imide precursor solution having a solid concentration of 22 wt % and a viscosity of 524 poise. Subsequently, a polyamide-imide film was manufactured according to the same procedure as in Example 1.

Comparative Example 12

In a 500 ml reactor which was equipped with a stirrer, a nitrogen injector, a dropping funnel, a temperature controller, and a condenser, 272.12 g of N-methyl-2-pyrrolidone (NMP) was charged while passing nitrogen therethrough, and 38.428 g (0.12 mol) of TFDB was dissolved. 12.357 g (0.042 mol) of BPDA and 17.539 g (0.042 mol) of 6FDA were added and dissolved. After the temperature of the solution was maintained at 15° C. or less, 8.392 g (0.144 mol) of propylene oxide was added, and then 7.309 g (0.036 mol) of TPC was added and reacted for 18 hours, thus obtaining a polyamide-imide precursor solution having a solid concentration of 22 wt % and a viscosity of 1420 poise. Subsequently, a polyamide-imide film was manufactured according to the same procedure as in Example 1.

Comparative Example 13

In a 500 ml reactor which was equipped with a stirrer, a nitrogen injector, a dropping funnel, a temperature controller, and a condenser, 270.874 g of N-methyl-2-pyrrolidone (NMP) was charged while passing nitrogen therethrough, and 11.528 g (0.036 mol) of TFDB was dissolved. 3.531 g (0.012 mol) of BPDA was reacted therewith for 2 hours, and 10.129 g (0.0228 mol) of 6FDA was added and reacted for 2 hours. Subsequently, 43.551 g (0.084 mol) of HFBAPP was added and dissolved for 1 hour. After the temperature of the solution was maintained at 15° C. or less, 19.582 g (0.336 mol) of propylene oxide was added, and then 17.054 g (0.084 mol) of TPC was added and reacted for 18 hours, thus obtaining a polyamide-imide precursor solution having a solid concentration of 22 wt % and a viscosity of 272 poise. Subsequently, a polyamide-imide film was manufactured according to the same procedure as in Example 1.

<Measurement>

The physical properties of the polyamide-imide films manufactured in the Examples and the Comparative Examples were evaluated using the following methods. The results are described in Table 1 below.

(1) Viscosity: The viscosity was measured twice at 25° C. using Scandal 6 or 7 of a Brookfield viscometer (RVDV-II+P) at 50 rpm to obtain the average value.

(2) Measurement of transmittance: The transmittance was measured three times at 550 nm using a UV spectrophotometer (Konica Minolta CM-3700d), and the average value is shown in Table 1.

(3) Measurement of yellow index (Y.I.): The yellow index was measured according to a ASTM E313 standard using a UV spectrophotometer (Konica Minolta, CM-3700d).

(4) Measurement of birefringence: The birefringence was measured at 532 nm using a birefringence analyzer (Prism Coupler, Sairon SPA4000) three times in each of TE (transverse electric) and TM (transverse magnetic) modes to obtain the average value, and (TE mode)-(TM mode) was taken as the birefringence value.

(5) Measurement of coefficient of thermal expansion (CTE): The coefficient of linear thermal expansion was measured twice at 50 to 250° C. using TMA (TA Instrument Company, Q400) according to a TMA method. The size of the sample was 4 mm×24 mm, the load was 0.02 N, and the rate of temperature increase was 10° C./min. Residual stress may remain in the film due to heat treatment after the film formation. With respect thereto, after the residual stress was completely removed in a first run, a second value was presented as the actually measured value.

(6) Dimension change: Measurement of dimension change (DC). The dimension change was repeatedly measured one to three times in a section at 50 to 250° C. according to a thermomechanical analysis method (TMA method) using TMA (TA Instrument Company, Q400). A difference (dimension change difference ΔDC=|A−B|) between a minimum value on a first heat-increasing curve (a dimension change value measured at 50° C., A) and a minimum value on a cooling curve (a dimension change value measured at 50° C., B) was calculated.

(7) Measurement of elongation at break (%): The elongation at break was measured according to an ASTM-D882 standard using a 5967 from Instron Company. The size of the sample was 15 mm×100 mm, the load cell was 1 KN, and the tensile rate was 10 mm/min when measured.

TABLE 1

| No. | Component (first block) + (second block) | Molar ratio | Viscosity (poise) | 550 nm transmittance (%) | Y.I. |
| --- | --- | --- | --- | --- | --- |
| Example 1 | (TFDB + BPDA + 6FDA) + (HFBAPP + TPC) | (80:60:20) + (20:20) | 2510 | 88.42 | 6.2 |
| Example 2 | (TFDB + BPDA + 6FDA) + (HFBAPP + TPC) | (80:40:40) + (20:20) | 2010 | 89.12 | 4.5 |
| Example 3 | (TFDB + BPDA + 6FDA) + (HFBAPP + TPC) | (80:20:60) + (20:20) | 1860 | 89.72 | 4.1 |
| Example 4 | (TFDB + BPDA + 6FDA) + (HFBAPP + IPC) | (80:40:40) + (20:20) | 1460 | 89.24 | 4.8 |
| Example 5 | (TFDB + BPDA + 6FDA) + (HFBAPP + TPC) | (70:35:35) + (30:30) | 1560 | 88.2 | 5.3 |
| Example 6 | (TFDB + BPDA + 6FDA) + (HFBAPP + TPC) | (50:25:25) + (50:50) | 1364 | 88 | 5.46 |
| Example 7 | (TFDB + BPDA + 6FDA) + (BAPSM + TPC) | (80:40:40) + (20:20) | 3010 | 89.16 | 3.8 |
| Example 8 | (TFDB + BPDA + 6FDA) + (4DDS + TPC) | (80:40:40) + (20:20) | 518 | 88.96 | 4.68 |
| Comparative Example 1 | HFBAPP + TPC | 100:100 | 1640 | 83.24 | 11.2 |
| Comparative Example 2 | HFBAPP + IPC | 100:100 | 1140 | 82.64 | 12.64 |
| Comparative Example 3 | BAPSM + TPC | 100:100 | 210 | 85.43 | 6.51 |
| Comparative Example 4 | 4DDS + TPC | 100:100 | 24 | 87.25 | 2.11 |
| Comparative Example 5 | TFDB + BPDA + 6FDA | 100:75:25 | 450 | 90.1 | 2.71 |
| Comparative Example 6 | TFDB + BPDA + 6FDA | 100:50:50 | 342 | 90.34 | 2.1 |
| Comparative Example 7 | TFDB + BPDA + 6FDA | 100:25:75 | 245 | 90.46 | 1.89 |
| Comparative Example 8 | (TFDB + 6FDA) + (HFBAPP + TPC) | (70:70) + (30:30) | 1840 | 89.85 | 3.46 |
| Comparative Example 9 | (TFDB + BPDA) + (HFBAPP + TPC) | (70:70) + (30:30) | 1140 | 88.1 | 8.41 |
| Comparative Example 10 | (4DDS + BPDA + 6FDA) + (HFBAPP + TPC) | (70:35:35) + (30:30) | 214 | 88.01 | 5.6 |
| Comparative Example 11 | TFDB + 4DDS:BPDA + 6FDA:TPC | 70 + 30:35 + 35:30 | 524 | 87.64 | 5.1 |
| Comparative Example 12 | TFDB:BPDA + 6FDA:TPC | 100:35 + 35:30 | 1420 | 89.4 | 2.8 |
| Comparative Example 13 | (TFDB + BPDA + 6FDA) + (HFBAPP + TPC) | (30:10:20) + (70:70) | 272 | 86.4 | 8.4 |

TABLE 2

| No. | Prism coupler TE mode | Prism coupler TM mode | Birefringence | Coefficient of linear thermal expansion (ppm/° C.) | Dimension change (μm) | Elongation at break (%) |
|---|---|---|---|---|---|---|
| Example 1 | 1.6429 | 1.6259 | 0.0170 | 52 | 100 | 8 |
| Example 2 | 1.6115 | 1.5972 | 0.0143 | 56 | 65 | 7.6 |
| Example 3 | 1.6095 | 1.6005 | 0.0090 | 62 | 42 | 7.1 |
| Example 4 | 1.6083 | 1.6015 | 0.0068 | 60 | 32 | 7.5 |
| Example 5 | 1.6233 | 1.6153 | 0.0080 | 67 | 45 | 8.6 |
| Example 6 | 1.6249 | 1.6152 | 0.0097 | 62 | 36 | 9.4 |
| Example 7 | 1.6236 | 1.6169 | 0.0067 | 54 | 58 | 7.2 |
| Example 8 | 1.635 | 1.6223 | 0.0127 | 58 | 76 | 7.8 |
| Comparative Example 1 | 1.634 | 1.614 | 0.02 | 75 | 35 | 22 |
| Comparative Example 2 | 1.629 | 1.616 | 0.013 | 82 | 24 | 24 |
| Comparative Example 3 | 1.6928 | 1.6922 | 0.0006 | 78 | 40 | 9 |
| Comparative Example 4 | 1.7273 | 1.6979 | 0.0294 | 42 | 21 | 8 |
| Comparative Example 5 | 1.6106 | 1.597 | 0.0136 | 54 | 185 | 5.5 |
| Comparative Example 6 | 1.5978 | 1.5865 | 0.0113 | 62 | 120 | 5 |
| Comparative Example 7 | 1.5758 | 1.5654 | 0.0104 | 68 | 104 | 4.8 |
| Comparative Example 8 | 1.6197 | 1.6158 | 0.0039 | 72 | 46 | 5.6 |
| Comparative Example 9 | 1.6459 | 1.6255 | 0.0204 | 47 | 115 | 9.1 |
| Comparative Example 10 | 1.6601 | 1.6525 | 0.0076 | 69 | 50 | 6.7 |
| Comparative Example 11 | 1.635 | 1.6223 | 0.0127 | 60 | 42 | 8.2 |
| Comparative Example 12 | 1.6177 | 1.5996 | 0.0181 | 54 | 64 | 5.4 |
| Comparative Example 13 | 1.624 | 1.611 | 0.013 | 66 | 41 | 14 |

From Tables 1 and 2, it could be found that the transmittance was higher and the yellow index (YI) and the birefringence were lower in Examples 1 to 8 than in Comparative Examples 1 to 4 on average, so that Examples 1 to 8 were suitable for a colorless and transparent film having excellent birefringence. Further, in Examples 1 to 8, the coefficient of thermal expansion was low, showing the excellent heat resistance.

Meanwhile, in Comparative Examples 5 to 7, the transmittance and the yellow index were excellent but the mechanical properties (elongation at break %) and the dimension change were large. However, in Examples 1 to 8, the transmittance was similar to that of Comparative Examples 5 to 7, better birefringence was obtained, the dimensional change was small, and the elongation at break was excellent, which showed that Examples 1 to 8 had better mechanical properties than typical polyimide films. Particularly, it could be confirmed that the birefringence and CTE values were further improved when the diamine (BAPSM) having a long flexible group and a substituent group, which was present at a meta position, was added (Example 7).

Further, in the case of Comparative Example 8 where BPDA was not included in the dianhydride, there was a limitation in improving the heat resistance and the elongation, and in the case of Comparative Example 9 where 6FDA was not included, the optical properties and the dimension change were reduced. When TFDB was not used as the diamine for forming the first block, the effect of improving the elongation at break was poor, as in Comparative Example 10. In the case of Comparative Example 11, where the first block and the second block were not formed in order and the polymerization was randomly performed, the birefringence and the transmittance were lower than in Example 5 where the polymerization was performed so that the blocks were separated.

Further, when a separate aromatic diamine having a flexible group was not used but the second block was formed using the diamine remaining after the first block was formed as in Comparative Example 12, it was difficult to control the birefringence and improve the elongation. When the second block had a higher molar ratio than the first block, as in Comparative Example 13, the elongation at break was significantly improved, but there was a limitation in improving the optical properties, such as the yellow index and the heat resistance, as in Comparative Examples 1 to 4.

The invention claimed is:
1. A polyamide-imide film comprising:
   a first block obtained by copolymerizing monomers including a dianhydride and a diamine, and
   a second block obtained by copolymerizing monomers including an aromatic dicarbonyl compound and an aromatic diamine,
   wherein the dianhydride includes biphenyltetracarboxylic acid dianhydride (BPDA) and 2-bis(3,4-dicarboxyphenyl)hexafluoropropane dianhydride (6FDA), and the diamine includes bistrifluoromethylbenzidine (TFDB),
   wherein the polyamide-imide film has an elongation at break of 7% or more, which is measured based on ASTM D882 (a film thickness of 10 to 50 μm), and
   wherein the polyamide-imide film has a dimension change difference (ΔDC) of 100 μm or less, which is defined by a difference (|A−B|) between a minimum value on a first heat-increasing curve (a dimension change value measured at 50° C., A) and a minimum value on a cooling curve (a dimension change value measured at 50° C., B) when repeatedly measured one to three times in a section at 50 to 250° C. using a thermomechanical analysis method (TMA-method) based on the film thickness of 10 to 50 μm
   wherein a molar ratio of the first block to the second block is 5:1 to 1:1
   wherein the first block includes a first repeating unit and a second repeating unit, and
   the second block includes a third repeating unit and a forth repeating unit, and
   wherein the polyamide-imide film is manufactured by imidizing a polyamide-imide precursor, and the polyamide-imide precursor is manufactured by:
   (1) solution polymerizing TFDB and BPDA to obtain the first repeating unit,
   (2) adding 6FDA to a reaction mixture of step (1) to obtain the second repeating unit;
   (3) adding to a reaction mixture of step (2) an aromatic diamine, and
   (4) adding to a reaction mixture of step (3) an aromatic dicarbonyl compound to obtain the third repeating unit and the forth repeating unit;

wherein molar amount of TFDB is larger than a molar sum of the BPDA in step (1) and the 6FDA in step (2), thereby the reaction mixture obtained by step (2) contains residual TFDB, and wherein the aromatic dicarbonyl compound reacts with the residual TFDB to form the third repeating unit and reacts with the aromatic diamine to form the forth repeating unit in step (4).

2. The polyamide-imide film of claim 1, wherein the polyamide-imide film has a birefringence (n) of 0.017 or less, which is defined using TE (transverse electric)-TM (transverse magnetic).

3. The polyamide-imide film of claim 1, wherein the polyamide-imide film has a coefficient of linear thermal expansion (CTE) of 70 ppm/° C. or less, which is repeatedly measured twice at 50 to 250° C. using a thermomechanical analysis method (TMA method) based on a film thickness of 10 to 50 μm.

4. The polyamide-imide film of claim 1, wherein the polyamide-imide film has a transmittance of 88% or more, which is measured at 550 nm based on a film thickness of 10 to 50 μm, and has a yellow index of 6.5 or less.

5. An image display device comprising:
the polyamide-imide film of claim 1.

* * * * *